UNITED STATES PATENT OFFICE.

LOUIS E. BARTON AND LONNIE W. RYAN, OF NIAGARA FALLS, NEW YORK, ASSIGNORS TO TITANIUM PIGMENT COMPANY, INC., OF NEW YORK, N. Y., A CORPORATION OF MAINE.

COMPOSITE TITANIUM PIGMENT AND METHOD OF MAKING SAME.

No Drawing. Application filed July 8, 1925. Serial No. 42,319.

In U. S. Letters Patent No. 1,205,144 of November 21, 1916, Reissued No. 14,289 of April 24, 1917 and No. 1,236,655 of August 14, 1917 granted to one of us, there have been disclosed certain processes whereby composite titanic oxide pigment products can be made by adding to a titanic sulphate solution a compound capable of forming, by reaction with such solution, an insoluble sulphate, thus supplying to the solution the requisite carrier particles by forming them by aid of chemical reactions with the solution itself; heating to precipitate upon said carriers titanium compounds in the form of either meta titanic acid or of basic titanic sulphate; withdrawing the composite precipitate and calcining it.

In the workings of these earlier processes involving the production of the sulphate carrier particles by their precipitation in the same tank as and with the titanic particles, the conditions were adjusted more particularly with reference to the precipitation of the latter so as to yield final products of certain compositions and properties.

We have now discovered that we can make a composite titanic oxide-calcium sulphate pigment product having greater and exceptional hiding power and other distinctive physical properties by so operating as to produce the calcium sulphate under more favorable conditions, i. e. by a preliminary formation thereof in another than the titanic solution, and its thereafter addition to the latter for the carrier purposes mentioned.

The preparation of our preferred form of calcium sulphate may be conducted in several different ways such as by reaction between either lime (CaO), or calcium carbonate (limestone), and sulphuric acid in presence of water; or by calcining natural calcium sulphate (gypsum), or artificially prepared or by-product calcium sulphate, to destruction of its original form, milling and treating with water to formation of hydrated calcium sulphate. In those modifications dependent upon reaction of lime or calcium carbonate with sulphuric acid it is not essential that the sulphuric acid be pure—the solution of iron sulphates containing free sulphuric acid obtained in the subsequent step of precipitating the titanium may be used for the purpose, thus resulting in an important economy. Furthermore, it is permissible either to add the lime containing material to the acid or vice versa, thus forming the calcium sulphate either in the presence of a dilute acid solution, or, if lime is used, of an alkaline solution. The latter condition is preferred by us where materials substantially free from impurities are used; but if materials containing elements likely to cause contamination of the calcium sulphate are used, as for example the acid iron sulphate solution referred to above, it is preferable to add the lime containing material to the acid solution, and the free acid should be somewhat in excess of that theoretically required.

A few examples of operation as preferred by us in preparing the calcium sulphate will more clearly indicate the modifications of this step.

*Example 1.*

Seventy-five (75) pounds of commercial lime (CaO) were slaked in 500 pounds of water and the slurry of hydrated lime diluted to 10% concentration. One hundred thirty-five (135) pounds of 66° Bé. sulphuric acid diluted with 500 pounds of water were slowly added to the lime slurry during a period of one hour with continuous agitation, the temperature meanwhile rising to 46° C. The charge was agitated for one hour after mixing to ensure complete reaction and then filtered to obtain a more concentrated calcium sulphate pulp.

*Example 2.*

To 2000 pounds of the acid liquor resulting from the titanium precipitation step, later to be described, which contained 7% free sulphuric acid and about 6% of ferrous sulphate, were added 132 pounds of limestone in form of a thin slurry having a concentration of about 40% solids. During the mixing the temperature was maintained at 25° C.; the charge was continuously agitated during the mixing and continued for one hour afterward to insure complete reaction. The charge was then filtered to yield a more concentrated calcium sulphate pulp.

*Example 3.*

220 pounds of natural gypsum were milled to about 300 mesh and then heated to a temperature of 110 to 120° C. for about 3 hours. This material, then weighing approximately 186 pounds, was added to 400 pounds of cold water with continuous agitation. Agitation was continued for one-half hour longer to insure complete re-formation of $CaSO_4.2H_2O$ before charging into the sulphate solution of titanium.

By whichever modification employed in this step of our process for making the calcium sulphate, it is essential that the carrier particles be finely divided and present a large surface for reception of the titanium particles to be subsequently precipitated. Our preferred form of calcium sulphate is characterized, when microscopically examined, by its crystalline structure, consisting of acicular crystals of extremely great length in proportion to their other dimensions, as distinguished from the relatively coarse calcium sulphates obtainable in the processes referred to and which show by microscopic examination a considerable proportion of the crystals in form of rhombic plates similar to natural gypsum.

We believe that to the peculiar structure of the calcium sulphate, presenting a large surface for adsorption of the titanium compounds, is attributable the exceptional hiding power and other desirable properties of our pigment product. It is also characteristic that our preferred form of calcium sulphate is particularly well adapted to be washed free from iron and other impurities carried in the precipitation charge, thus resulting in a whiter pigment containing less impurity than heretofore possible.

Having obtained our preferred form of calcium sulphate, our composite titanium pigment product is prepared by adding it to a solution of titanium; then heating the charge to boiling to hydrolyze and precipitate the titanium compounds; then separating and washing the composite precipitate— as by filtration, and finally calcining it. Such factors as concentration and acidity of solution during precipitation and calcination temperature may be varied within wide limits depending upon the result desired; therefore we do not limit ourselves to the conditions specified in the following example which is given for the purpose of illustration and to indicate one set of conditions which will yield an average product.

Titanium sulphate solution prepared in any manner whatsoever may be used, as for example, one formed by the digestion of ilmenite with sulphuric acid and subsequent solution in water. The iron is first reduced to the ferrous state in any convenient manner, such as electrolytic reduction or treatment with metals. We prefer to accomplish this reduction with metallic iron.

One such titanium sulphate solution thus prepared analyzed as follows:—

| | |
|---|---|
| Titanic oxide | 5.73% |
| Ferrous oxide | 4.80% |
| Zirconia, alumina, etc. Small amounts present. | |
| Sulphuric anhydride | 22.45% |

Using this titanic sulphate solution and our preferred form of calcium sulphate pulp, a charge was made as follows:—

| | Lbs. |
|---|---|
| Titanic sulphate solution | 1100 |
| Calcium sulphate pulp | 560 |
| (= 220 lbs. $CaSO_4.2H_2O$) | |
| Water | 350 |

The charge was heated to boiling and continuously agitated until a sample showed by analysis that 95% of the titanium had been precipitated. The time required was about 5 hours. The charge was then diluted with an equal volume of water, allowed to settle and the clear supernatant liquor decanted. The decanted liquor which contains the sulphuric acid set free by hydrolysis of the titanium compounds during precipitation is available for the precipitation of another batch of calcium sulphate as in Example 2 before given. After decantation of the acid liquor the charge was filtered, washed and calcined at 900° C. for 3 hours. The yield was found to be about 200 pounds of pigment which contained by analysis:—

| | |
|---|---|
| Titanic oxide | 29.40% |
| Calcium sulphate (by diff.) | 70.60% |
| Sp. gr. of pigment | 3.22 |

In the example we have used quantities of materials to give a pigment containing 30% titanic oxide, but we do not wish to be limited to this particular composition. We may so proportion the charge as to obtain a pigment of any other desired titanium oxide content.

Our pigment product is characterized by its exceptional chemical purity and unique physical properties. As discharged from the calciner the pigment is in form of a very soft fine white powder, showing when examined under high magnification, the characteristic needle-like structure before referred to in describing our preferred form of calcium sulphate. The titanic oxide, though present in large amount, is not so easily distinguishable, apparently being coalesced with, but not destroying the characteristic structure of the calcium sulphate.

The physical properties of the pigment after calcination are such that the product may be used, if desired, as a pigment for paint and for other purposes without the usual milling operation.

We claim as our invention:

1. In the production of composite titanium pigments from a titanium solution, the step which consists in precipitating compounds of titanium upon acicularly crystalline particles of calcium sulphate without destroying their preformed acicularly crystalline structure in said solution.

2. In the production of composite titanium pigments from a titanium solution, the step which consists in precipitating compounds of titanium upon finely-divided, acicularly crystalline particles of calcium sulphate without destroying their preformed acicularly crystalline structure in said solution.

3. The method of making composite titanium pigments from a titanium solution which comprises separately and preliminarily forming a suspension comprising acicularly crystalline particles of calcium sulphate, then adding same to the titanium solution, treating the charge to precipitate the titanium compounds upon said calcium sulphate particles, separating the precipitates from the solution, and calcining same.

4. The method of making composite titanium pigments from a titanium solution which comprises separately and preliminarily forming a concentrated suspension comprising acicularly crystalline particles of calcium sulphate, then adding same to the titanium solution, treating the charge to precipitate the titanium compounds upon said calcium sulphate particles, separating the precipitates from the solution, and calcining same.

5. The method of making composite titanium pigments from a titanium solution which comprises separately and preliminarily forming a suspension comprising acicularly crystalline particles of calcium sulphate, then adding same to the titanium solution, treating the charge to precipitate the titanium compounds upon said calcium sulphate particles, separating the composite precipitate from the solution, and calcining same.

6. The method of making composite titanium pigments from a titanium solution which comprises separately and preliminarily forming a concentrated suspension comprising acicularly crystalline particles of calcium sulphate, then adding same to the titanium solution, treating the charge to precipitate the titanium compounds upon said calcium sulphate particles, separating the composite precipitate from the solution, and calcining same.

7. The method of making composite pigments from a titanium sulphate solution which comprises separately and preliminarily forming a suspension comprising acicularly crystalline particles of finely-divided particles of hydrated calcium sulphate, then adding same to the titanium sulphate solution, treating the charge to precipitate the titanium compounds upon said calcium sulphate particles, separating the precipitates from the solution, and calcining same.

8. The method of making composite titanium pigments from a titanium sulphate solution which comprises separately and preliminarily forming a concentrated suspension comprising acicularly crystalline particles of finely-divided particles of hydrated calcium sulphate, then adding same to the titanium sulphate solution, treating the charge to precipitate the titanium compounds upon said calcium sulphate particles, separating the precipitates from the solution, and calcining same.

9. The method of making composite titanium pigments from a titanium solution which comprises separately and preliminarily forming an aqueous suspension comprising acicularly crystalline particles of calcium sulphate, then adding same to the titanium solution, boiling the charge to precipitation of the titanium compounds upon said calcium sulphate particles, filtering the solution to separate therefrom the precipitates, and calcining same.

10. The method of making composite titanium pigments from a titanium solution which comprises forming preliminarily and apart from said solution a concentrated aqueous suspension comprising acicularly crystalline particles of calcium sulphate, then adding same to the titanium solution, boiling the charge to precipitation of the titanium compounds upon said calcium sulphate particles, filtering the solution to separate therefrom the coalesced precipitates, and calcining same.

11. In the production of composite titanium pigments from a titanium solution, the step which consists in precipitating compounds of titanium upon finely-divided, substantially uniform, acicularly crystalline particles of calcium sulphate presenting a comparatively large surface in said solution.

12. In the production of composite titanium pigments from a titanium solution, the steps which consist in preliminarily forming a suspension of finely-divided, acicularly crystalline particles of calcium sulphate, and precipitating compounds of titanium upon said particles in said solution through heat without destroying their acicularly crystalline fineness.

13. The method of making composite titanium pigments, which comprises preliminarily preparing a suspension comprising minute, substantially uniform and acicularly crystalline particles of calcium sulphate; thickening said calcium sulphate to form of pulp; adding said pulp to a titanium solution; heating the charge to precipitation of titanium compounds upon said calcium sulphate particles; separating the composite precipitates, and calcining same.

14. As a new article, a composite pigment comprising titanic oxide coalesced with acicularly crystalline particles of calcium sulphate of minute substantially uniform fineness.

15. As a new article, a composite pigment comprising titanic oxide coalesced with acicularly crystalline particles of calcium sulphate of minute substantially uniform fineness and in quantity greater than said titanic oxide.

16. As a new article, a composite pigment of specific gravity approximately 3.22 in the form of a soft, fine powder, substantially white in color, and comprising titanic oxide coalesced with acicularly crystalline particles of calcium sulphate of minute substantially uniform fineness.

17. As a new article, a composite pigment of specific gravity approximately 3.22 in the form of a soft, fine powder, substantially white in color, and comprising a calcined product consisting principally of finely-divided, substantially uniform particles of calcium sulphate in the form of acicular crystals coalesced with particles of titanic oxide.

18. As a new article, a composite pigment of specific gravity approximately 3.22 in the form of a soft, fine powder, substantially white in color, and comprising a calcined product consisting essentially of finely-divided, substantially uniform particles of calcium sulphate in the form of acicular crystals coalesced with particles of titanic oxide, the calcium sulphate being in quantity greater than said titanic oxide.

LOUIS E. BARTON.
LONNIE W. RYAN.